(12) United States Patent
Youn

(10) Patent No.: US 9,420,270 B2
(45) Date of Patent: Aug. 16, 2016

(54) 3D GLASSES INCLUDING A COLOR COORDINATE CONTROLLER AND A DISPLAY DEVICE USING THE SAME

(71) Applicant: SAMSUNG DISPLAY CO., LTD., Yongin, Gyeonggi-Do (KR)

(72) Inventor: Jung-Soo Youn, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 236 days.

(21) Appl. No.: 14/190,577

(22) Filed: Feb. 26, 2014

(65) Prior Publication Data

US 2015/0015684 A1   Jan. 15, 2015

(30) Foreign Application Priority Data

Jul. 10, 2013 (KR) ......................... 10-2013-0081242

(51) Int. Cl.
*H04N 13/04* (2006.01)
*H04N 13/00* (2006.01)

(52) U.S. Cl.
CPC ....... *H04N 13/0422* (2013.01); *H04N 13/0025* (2013.01); *H04N 13/0037* (2013.01); *H04N 13/0429* (2013.01); *H04N 13/0438* (2013.01); *H04N 13/0497* (2013.01); *H04N 13/0452* (2013.01); *H04N 2213/008* (2013.01)

(58) Field of Classification Search
CPC .......... H04N 13/0422; H04N 13/0429; H04N 13/0438
See application file for complete search history.

(56) References Cited

U.S. PATENT DOCUMENTS

| | | | |
|---|---|---|---|
| 2007/0285436 A1* | 12/2007 | Wu | G09G 5/06 345/604 |
| 2012/0147162 A1* | 6/2012 | Park | H04N 13/0422 348/60 |
| 2012/0299817 A1* | 11/2012 | Atkins | G02B 27/0093 345/156 |

FOREIGN PATENT DOCUMENTS

| | | |
|---|---|---|
| KR | 1020060093821 | 8/2006 |
| KR | 1020110128018 | 11/2011 |
| KR | 1020120059947 | 6/2012 |
| KR | 1020120064925 | 6/2012 |

\* cited by examiner

*Primary Examiner* — Huy T Nguyen
(74) *Attorney, Agent, or Firm* — F. Chau & Associates, LLC

(57) ABSTRACT

A display device includes a controller and a display. The controller is configured to receive a first color coordinate control signal and a second color coordinate control signal, and generate an image data signal by adjusting an input image signal according to the first and second color coordinate control signals. The display is configured to display an image according to the image data signal. The first and second color coordinate control signals are transmitted to the display device by a pair of three-dimensional (3D) glasses.

20 Claims, 2 Drawing Sheets

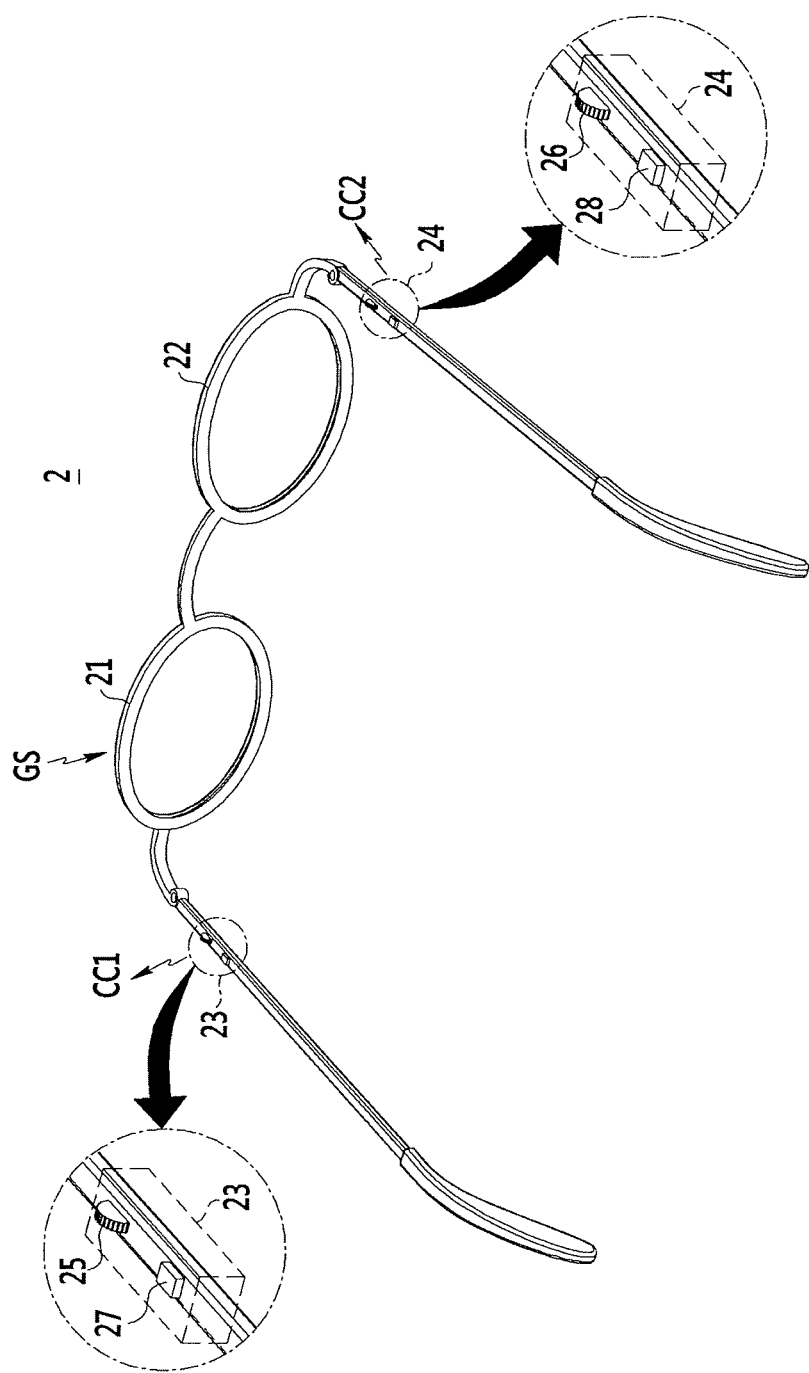

3D GLASSES INCLUDING A COLOR COORDINATE CONTROLLER AND A DISPLAY DEVICE USING THE SAME

CROSS-REFERENCE TO RELATED APPLICATIONS

This application claims priority under 35 U.S.C. §119 to Korean Patent Application No. 10-2013-0081242 filed on Jul. 10, 2013, the disclosure of which is incorporated by reference herein in its entirety.

TECHNICAL FIELD

Exemplary embodiments of the present invention relate to 3D glasses including a color coordinate control means and a display device using the same.

DISCUSSION OF THE RELATED ART

An image quality difference may exist between a two-dimensional (2D) image and a three-dimensional (3D) image displayed by a display device. For example, referring to a liquid crystal display (LCD), a voltage level that influences image quality may be based on 2D image quality, and as a result, limitations may exist with regards to improving 3D image quality (e.g., a color coordinate difference between a left-eye image and a right-eye image when displaying a 3D image may decrease 3D image quality).

SUMMARY

Exemplary embodiments of the present invention provide a device for compensating a color coordinate difference between left-eye images and right-eye images.

According to an exemplary embodiment of the present invention, a display device includes a controller configured to receive a first color coordinate control signal and a second color coordinate control signal, and generate an image data signal by adjusting (e.g., correcting) an input image signal according to the first color coordinate control signal and the second color coordinate control signal. The display device further includes a display configured to display an image according to the image data signal. The first color coordinate control signal and the second color coordinate control signal are transmitted to the display device by a pair of three-dimensional (3D) glasses.

The display device further includes a receiver configured to receive the first color coordinate control signal and the second color coordinate control signal and generate a color coordinate correction signal. The controller is configured to generate the image data signal according to the color coordinate correction signal.

The color coordinate correction signal may be used to change the input image signal into the image data signal, and may indicate a correction degree of a color coordinate of a color displayed according to the input image signal.

The controller may control a brightness control algorithm corresponding to the input image signal (e.g., RGB signals) according to the color coordinate correction signal, and may generate the image data signal using the controlled brightness control algorithm.

The controller may utilize a first color coordinate control algorithm when a two-dimensional (2D) image is displayed, and a second color coordinate control algorithm, different from the first color coordinate control algorithm, when a 3D image is displayed.

According to an exemplary embodiment of the present invention, a pair of 3D glasses includes a first color coordinate control means corresponding to a left-eye image displayed on a display device, and a second color coordinate control means corresponding to a right-eye image displayed on the display device. A control amount provided through the first color coordinate control means and a control amount provided through the second color coordinate control means are transmitted to the display device.

The first color coordinate control means may include a first control wheel, and the control amount provided through the first color coordinate control means may be determined by a rotation angle and a rotation direction of the first control wheel.

The second color coordinate control means may include a second control wheel, and the control amount provided through the second color coordinate control means may be determined by a rotation angle and a rotation direction of the second control wheel.

According to an exemplary embodiment of the present invention, the color coordinate control means for the left-eye image and the right-eye image is provided to compensate for the color coordinate difference between the left-eye image and the right-eye image.

BRIEF DESCRIPTION OF THE DRAWINGS

FIG. 2 shows a pair of 3D glasses according to an exemplary embodiment of the present invention.

DETAILED DESCRIPTION OF THE EXEMPLARY EMBODIMENTS

Figure 1:
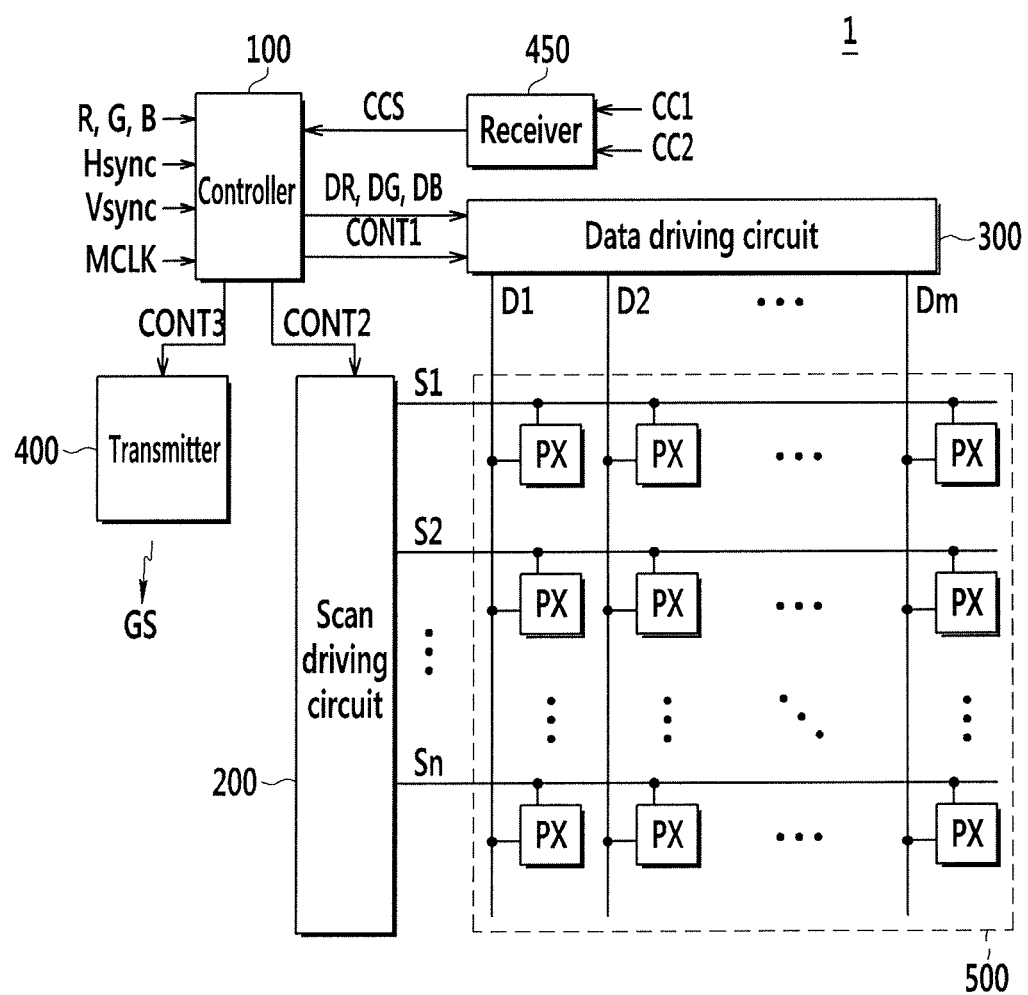
FIG. 1 shows a display device according to an exemplary embodiment of the present invention.

Exemplary embodiments of the present invention will be described more fully hereinafter with reference to the accompanying drawings. Like reference numerals may refer to like elements throughout the accompanying drawings.

An exemplary embodiment of the present invention utilizes a configuration allowing for the correction of a color difference phenomenon that may occur between a left-eye image and a right-eye image when displaying a three-dimensional (3D) image.

For example, in an exemplary embodiment, a pair of 3D glasses worn by a user to perceive 3D images includes a control means. The control means controls the respective color coordinates of the image projected to the left eye through the 3D glasses (e.g., the left-eye image) and the image projected to the right eye through the 3D glasses (e.g., the right-eye image).

The control means may be implemented using a control wheel attached to the 3D glasses, and control the degree of correction of the left-eye image and the right-eye image via user manipulation of the control wheel. Although exemplary embodiments described herein utilize a control wheel as the control means, exemplary embodiments are not limited thereto. For example, in exemplary embodiments, the control means may be implemented using, for example, a button, a switch, a slider, etc.

According to exemplary embodiments, the means for controlling the color coordinates of the left-eye image and the right-eye image allow for color difference compensation. For example, according to exemplary embodiments, the user may use the control means to separately control the color coordinates of the left-eye image and the right-eye image depending on current conditions (e.g., current user conditions, current viewing conditions, etc).

In exemplary embodiments described herein, the control means includes two control wheels disposed on the 3D glasses, and the color coordinates of the left-eye image and the right-eye image are adjusted (e.g., corrected) in response to the degree of rotation of the control wheels. Thus, exemplary embodiments may be described as including a first color coordinate control means (e.g., corresponding to a left-eye image) and a second color coordinate control means (e.g., corresponding to a right-eye image). When the control wheels are manipulated, the color coordinates are transmitted to the display device, and the color coordinates of image signals are controlled by manipulation of the control wheels.

For example, in an exemplary embodiment, the control wheel disposed on the right side of the 3D glasses (e.g., the side corresponding to the user's right eye) may controls an x-axis coordinate (Wx) of the color coordinates, and the control wheel disposed on the left side of the 3D glasses (e.g., the side corresponding to the user's left eye) may control a y-axis coordinate (Wy) of the color coordinates. In an exemplary embodiment, the function of these control wheels may be reversed.

When the color coordinates are changed by the control wheels, brightness control algorithms may respectively be used for RGB signals. For example, in an exemplary embodiment, the color coordinate control algorithm used when a two-dimensional (2D) image is displayed and the color coordinate control algorithm used when a 3D image is displayed may be applied in a separate manner.

Since excessive color coordinate control may be generated as a result of the user's manipulation, control units of Wx and Wy may be controlled. Further, excessive color coordinate control may be controlled by controlling a rotation range of the control wheels of the 3D glasses. For example, the control wheels may be controlled such that the wheels may only be rotated up to a predetermined angle (e.g., about 90 degrees) with reference to a default value.

An exemplary embodiment of the present invention will be described herein with reference to FIGS. 1 and 2.

FIG. 1 shows a display device according to an exemplary embodiment of the present invention.

FIG. 2 shows a pair of 3D glasses according to an exemplary embodiment of the present invention.

The display device 1 is configured to be used with the pair of 3D glasses 2 shown in FIG. 2. For example, when a 2D image is displayed on the display device 1, a left eye lens 21 and a right eye lens 22 of the 3D glasses 2 may be opened. When a 3D image is displayed on the display device 1, the left eye lens 21 and the right eye lens 22 of the 3D glasses 2 may be synchronized depending on a type and a display period of the image displayed on the display device 1, and the opening/closing of the left eye lens 21 and the right lens 22 of the 3D glasses 2 may be controlled.

The 3D glasses 2 may transmit and receive signals to and from the display device 1 through a variety of wireless means including, for example, radio communication. The radio communication is not limited to a specific implementation, and the communication of signals is not limited to radio communication.

As shown in FIG. 1, the display device 1 includes a controller 100, a scan driving circuit 200, a data driving circuit 300, a transmitter 400, a receiver 450, and a display 500.

The controller 100 receives input image signals (R, G, B) and an input control signal for controlling the display of the input image signals (R, G, B). The input image signals (R, G, B) include luminance information relating to respective pixels (PX) of the display 500. The luminance information may include, for example, data indicating a grayscale of the corresponding pixel from among a predetermined number, for example, $1024=2^{10}$, $256=2^8$, or $64=2^6$ grayscales. The input control signal may include, for example, a vertical synchronization signal (Vsync), a horizontal synchronization signal (Hsync), and a main clock signal (MCLK).

The controller 100 processes the input image signals (R, G, B) according to an operational condition of the display 400 and the data driving circuit 300, and generates image data signals (DR, DG, DB). When the display device 1 is in a driving mode in which the 3D image is displayed, the controller 100 may adjust (e.g., correct) the image data signals (DR, DG, DB), which indicate the left-eye image and the right-eye image when displaying the 3D image, according to a color coordinate correction signal (CCS) provided by the receiver 450.

The color coordinate correction signal (CCS) is used in a process that includes changing the input image signals (R, G, B) into the image data signals (DR, DG, DB). The color coordinate correction signal (CCS) includes a value indicating a correction degree of the color coordinates of the color displayed according to the corresponding input image signals (R, G, B) in a predetermined color coordinate system (e.g., the CIE 1931 color coordinate system).

For example, in the CIE 1931 color coordinate system, a value indicating a movement degree of the color coordinates of the color displayed in x-axis and y-axis directions can be included in the color coordinate correction signal (CCS).

The controller 100 controls the brightness control algorithm corresponding to the input image signals (e.g., for the respective RGB signals) according to the color coordinate correction signal (CCS), and uses the controlled brightness control algorithm to generate the image data signals (DR, DG, DB). The controller 100 distinguishes color coordinate control algorithms based on when a 2D image is displayed and when a 3D image is displayed. For example, the controller 100 may utilize different color coordinate control algorithms based on whether a 2D image or a 3D image is displayed (e.g., based on whether the data driving circuit 300 is in a 2D driving mode or a 3D driving mode).

The controller 100 generates a data control signal (CONT1), a scan control signal (CONT2), and a glasses control signal (CONT3) according to the input control signal.

The controller 100 distinguishes the input image signals (R, G, B) for each frame in synchronization with the vertical synchronization signal (Vsync), and distinguishes the input image signals (R,G,B) for each row in synchronization with the horizontal synchronization signal (Hsync) to generate the image data signals (DR, DG, DB). The controller 100 transmits the scan control signal (CONT2) to the scan driving circuit 200, and transmits the data control signal (CONT1) and the image data signals (DR, DG, DB) to the data driving circuit 300.

The controller 100 generates a glasses control signal (CONT3) for controlling opening/closing of the left eye lens 21 and the right eye lens 22 of the 3D glasses according to the type and the display period of the image displayed by the display 500 in the 3D image driving mode.

The scan driving circuit 200 transmits a plurality of scan signals to a plurality of scan lines (S1-Sn) according to the scan control signal (CONT2). The data driving circuit 300 generates a plurality of data signals corresponding to the image data signals (DR, DG, DB), and transmits the image data signals (DR, DG, DB) to a plurality of data lines (D1-Dm) according to the data control signal (CONT1).

The display 500 includes a plurality of data lines (D1-Dm) extending in a column direction, a plurality of scan lines (S1-Sn) extending in a row direction, and a plurality of pixels (PX). The data lines (D1-Dm) and the scan lines (S1-Sn) are connected to the pixels (PX).

The pixels (PX) respectively display one of red (R), green (G), and blue (B). A plurality of data voltages corresponding to the image data signals (DR, DG, DB) are transmitted to the pixels (PX) through the data lines (D1-Dm). The scan signals for selecting the pixel (PX) for each row are transmitted to the pixels (PX) through the scan lines (S1-Sn).

The pixels (PX) may include, for example, an organic light emitting diode (OLED) or a liquid crystal element.

The transmitter 400 transmits a glasses driving signal (GS) for controlling the 3D glasses 2 according to the glasses control signal (CONT3). The glasses driving signal (GS) can be transmitted wirelessly through, for example, radio communication. However, transmission of the glasses driving signal (GS) is not limited thereto.

The receiver 450 receives a first color coordinate control signal (CC1) and a second color coordinate control signal (CC2) from the 3D glasses 2, and generates the color coordinate correction signal (CCS). The first color coordinate control signal (CC1) and the second color coordinate control signal (CC2) are respectively generated according to a control amount provided by control means 23 and 24 (e.g., first and second color coordinate control means) of the 3D glasses 2.

For example, the control means 23 receives a color coordinate control amount corresponding to the left-eye image, and the control means 24 receives a color coordinate control amount corresponding to the right-eye image. When the control means 23 and 24 include control wheels 25 and 26, as shown in the exemplary embodiment of FIG. 2, the color coordinate control amount corresponding to the left-eye image is determined according to a rotation angle and a rotation direction of the control wheel 25, and the color coordinate control amount corresponding to the right-eye image is determined according to a rotation angle and a rotation direction of the control wheel 26. As used herein, the rotation angle of the control wheels 25 and 26 may be described as referring to the degree of rotation, or the amount of rotation, of the control wheels 25 and 26.

The control means 23 and 24 may further include transmitting means 27 and 28. The transmitting means 27 transmits the first color coordinate control signal (CC1) generated by the determined color coordinate control amount according to the rotation angle and the rotation direction of the control wheel 25. The transmitting means 28 transmits the second color coordinate control signal (CC2) generated by the determined color coordinate control amount according to the rotation angle and the rotation direction of the control wheel 26. In an exemplary embodiment, the transmitting means 27 and 28 may be replaced with a single transmitting means in communication with both control means 23 and 24, and capable of transmitting both the first color coordinate control signal (CC1) and the second color coordinate control signal (CC2).

The control means 23, which may include the control wheel 25 and the transmitting means 27, may be disposed on a left portion of the 3D glasses 2 (e.g., a portion near the left eye lens 21). The control means 24, which may include the control wheel 26 and the transmitting means 28, may be disposed on a right portion of the 3D glasses 2 (e.g., a portion near the right eye lens 22). For example, the control means 23 may be disposed on the left temple of the pair of 3D glasses 2, and the control means 24 may be disposed on the right temple of the pair of 3D glasses 2, as shown in FIG. 2. However, the respective locations of the control means 23 and 24 are not limited thereto.

The 3D glasses 2 are configured to open the left eye lens 21 and close the right eye lens 22 in synchronization with a period in which the display 500 displays the left-eye image according to the glasses driving signal (GS), and open the right eye lens 22 and close the left eye lens 21 in synchronization with a period in which the display 500 displays the right-eye image according to the glasses driving signal (GS).

As described above, exemplary embodiments are not limited to the control means 23 and 24 each including separate transmitting means. For example, a signal for distinguishing the control amount provided by the control means 23 and 24 may be generated and transmitted.

According to exemplary embodiments of the present invention, a color coordinate control means is provided on a pair of 3D glasses, allowing the user to control the color coordinates of a left-eye image and a right-eye image by manipulating the color coordinate control means when a 3D image is displayed. As a result, deterioration of image quality occurring as the result of a deviation of the left-eye image and the right-eye image may be prevented or reduced.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A display device, comprising:
a controller configured to receive a first color coordinate control signal and a second color coordinate control signal, and generate an image data signal by adjusting an input image signal according to the first and second color coordinate control signals; and
a display configured to display an image according to the image data signal,
wherein the first and second color coordinate control signals are transmitted to the display device by a pair of three-dimensional (3D) glasses, the first color coordinate control signal corresponds to a left-eye image, and the second color coordinate control signal corresponds to a right-eye image.

2. The display device of claim 1, wherein the display device further comprises:
a receiver configured to receive the first and second color coordinate control signals and generate a color coordinate correction signal according to the first and second color coordinate control signals,
wherein the controller is configured to generate the image data signal according to the color coordinate correction signal.

3. The display device of claim 2, wherein the color coordinate correction signal indicates a correction degree of a color coordinate of a color displayed by the display.

4. The display device of claim 2, wherein the controller is configured to control a brightness control algorithm corresponding to the input image signal according to the color coordinate correction signal, and generate the image data signal using the brightness control algorithm.

5. The display device of claim 1, wherein the controller is configured to utilize a first color coordinate control algorithm when a two-dimensional (2D) image is displayed, and a second color coordinate control algorithm, different from the first color coordinate control algorithm, when a 3D image is displayed.

6. The display device of claim 1, wherein the input image signal is adjusted relative to a predetermined color coordinate system.

7. The display device of claim 6, wherein the predetermined color coordinate system is a CIE 1931 color coordinate system.

8. The display device of claim 1, further comprising a transmitter configured to wirelessly transmit a glasses driving signal to the pair of 3D glasses to control the pair of 3D glasses.

9. The display device of claim 8, wherein the glasses driving signal is transmitted from the transmitter to the pair of 3D glasses via radio communication.

10. A pair of three-dimensional (3D) glasses, comprising:
   a first color coordinate control means corresponding to a left-eye image displayed on a display device; and
   a second color coordinate control means corresponding to a right-eye image displayed on the display device,
   wherein the pair of 3D glasses is configured to transmit a first control amount provided through the first color coordinate control means and a second control amount provided through the second color coordinate control means to the display device.

11. The pair of 3D glasses of claim 10, wherein the first color coordinate control means comprises a first control wheel, and the first control amount provided through the first color coordinate control means is determined by a rotation angle and a rotation direction of the first control wheel.

12. The pair of 3D glasses of claim 11, wherein the second color coordinate control means comprises a second control wheel, and the second control amount provided through the second color coordinate control means is determined by a rotation angle and a rotation direction of the second control wheel.

13. The pair of 3D glasses of claim 12, further comprising a first transmitting means corresponding to the first control wheel, and configured to transmit the first control amount to the display device.

14. The pair of 3D glasses of claim 13, further comprising a second transmitting means corresponding to the second control wheel, and configured to transmit the second control amount to the display device.

15. The pair of 3D glasses of claim 14, wherein the first control wheel and the first transmitting means are disposed on a left portion of the pair of 3D glasses near a left eye lens of the pair of 3D glasses, and the second control wheel and the second transmitting means are disposed on a right portion of the pair of 3D glasses near a right eye lens of the pair of 3D glasses.

16. A three-dimensional (3D) display system, comprising:
   a display device, comprising:
      a controller configured to receive a first color coordinate control signal and a second color coordinate control signal, and generate an image data signal by adjusting an input image signal according to the first and second color coordinate control signals, and
      a display configured to display an image according to the image data signal; and
   a pair of 3D glasses, comprising:
      a first color coordinate control means corresponding to a left-eye image displayed on the display device, and
      a second color coordinate control means corresponding to a right-eye image displayed on the display device,
      wherein the pair of 3D glasses is configured to transmit a first control amount provided through the first color coordinate control means and a second control amount provided through the second color coordinate control means to the display device,
      wherein the first and second color coordinate control signals are transmitted to the display device by the pair of 3D glasses.

17. The display system of claim 16, wherein the display device further comprises:
   a receiver configured to receive the first and second color coordinate control signals and generate a color coordinate correction signal according to the first and second color coordinate control signals,
   wherein the controller is configured to generate the image data signal according to the color coordinate correction signal.

18. The display system of claim 17, wherein the color coordinate correction signal indicates a correction degree of a color coordinate of a color displayed by the display.

19. The display system of claim 16, wherein the first color coordinate control means comprises a first control wheel, and the first control amount provided through the first color coordinate control means is determined by a rotation angle and a rotation direction of the first control wheel.

20. The display system of claim 19, wherein the second color coordinate control means comprises a second control wheel, and the second control amount provided through the second color coordinate control means is determined by a rotation angle and a rotation direction of the second control wheel.

* * * * *